United States Patent [19]
Kelley

[11] 3,752,239
[45] Aug. 14, 1973

[54] VARIABLE RIPPER PLOW SHANK ASSEMBLY

[76] Inventor: Leon O. Kelley, P.O. Box 488, Stamford, Tex.

[22] Filed: June 1, 1971

[21] Appl. No.: 148,727

[52] U.S. Cl................. 172/699, 172/739, 254/104
[51] Int. Cl............................................. A01b 13/08
[58] Field of Search .............. 37/98, 193; 172/739, 172/740, 699, 700; 61/72.6; 254/104

[56] References Cited
UNITED STATES PATENTS

| 3,022,836 | 2/1962 | Bechman | 172/739 X |
| 3,120,281 | 2/1964 | Peveler et al. | 172/699 |
| 3,546,887 | 10/1968 | Helmus | 61/72.6 X |
| 105,810 | 7/1870 | Keller | 172/739 |
| 7,220 | 3/1850 | Lamborn | 172/739 X |
| 2,545,949 | 3/1951 | Fox | 254/104 X |
| 3,050,135 | 8/1962 | Kelley | 172/699 X |
| 2,153,038 | 4/1939 | Corbett | 172/699 X |
| 3,571,956 | 3/1971 | Heiberg | 37/193 X |
| 3,578,090 | 5/1971 | Cline | 172/699 X |
| 2,870,639 | 1/1959 | Suderow | 254/104 X |
| 1,544,795 | 7/1925 | Barrett | 172/739 |
| 3,515,222 | 6/1970 | Kant | 61/72.6 X |
| 3,657,831 | 4/1972 | Kant | 37/193 |

FOREIGN PATENTS OR APPLICATIONS 1,015,160  12/1965  Great Britain ................... 172/699

Primary Examiner—Robert E. Pulfrey
Assistant Examiner—Clifford D. Crowder
Attorney—Richards, Harris & Hubbard

[57] ABSTRACT

A variable plow shank positioning assembly for use on a variety of plows. The assembly includes a shank support member pivotally mounted in a plow and including an aperture therein for rigidly receiving a plow shank. Wedges are slideably moveable by a hydraulic cylinder to abut with upper and lower pads pivoted on the shank support member to selectively pivot the support member relative to the plow. A spring is disposed to normally bias the shank support member in a predetermined angular orientation.

11 Claims, 9 Drawing Figures

Patented Aug. 14, 1973

INVENTOR:
LEON O. KELLEY

Richards, Harris & Hubbard
ATTORNEYS

Patented Aug. 14, 1973

INVENTOR:
LEON O. KELLEY

Richards, Harris & Hubbard
ATTORNEYS

INVENTOR:
LEON O. KELLEY

ATTORNEYS

INVENTOR:
LEON O. KELLEY

VARIABLE RIPPER PLOW SHANK ASSEMBLY

FIELD OF THE INVENTION

This invention relates to plows, and more particularly relates to plows having structure for automatically varying the angular position of one or more plow shanks.

THE PRIOR ART

A wide variety of plows, and particularly ripper plows, have been heretofore developed. In many plows, the plow shank may be moved vertically within the plow frame and pinned in a desired position to provide a predetermined shank depth. In addition, it is often desirable to provide different penetration angles to the plow shanks for use in different mediums for maximum plowing results. Previously developed plows have not provided the capability to easily and automatically vary the angular position of one or more plow shanks, while insuring that the plow shanks remain in a rigid configuration during plowing operations.

SUMMARY OF THE INVENTION

In accordance with the present invention, a plow assembly includes a plow frame for attachment to a prime mover. At least one plow shank is carried by the frame, and structure is provided to automatically vary the angular position of the shank within the frame.

In accordance with another aspect of the invention, a plow includes at least one shank, with a shank support member pivotally mounted on the plow and rigidly supporting the shank. Structure is provided to selectively pivot the support member relative to the plow to vary the angle of penetration of the shank.

In accordance with yet another aspect of the present invention, a variable plow shank positioning assembly includes a shank support member pivotally mounted in a plow and including an aperture for rigidly receiving a plow shank. Wedges are slidably movable to abut with and pivot the support member. A pressurized fluid cylinder is operable to move the wedges.

In accordance with a yet more specific aspect of the invention, a plow frame is provided with outwardly diverging arms at the forward end for connection to a prime mover. The rearward end of the plow frame is elongate and narrower than the forward end. A shank support member is pivotally mounted in the rearward end of the plow frame and includes an aperture for receiving a plow shank. A hydraulic cylinder is mounted on the rearward end of the plow frame and is operable to pivot the shank support member to selectively position the shank.

In accordance with another specific aspect of the invention, an integral plow frame has three outwardly extending arms and structure for connection to a prime mover. Two of the arms are mounted rearward of the third arm. Shank support members are pivotally mounted in the extremities of each of the arms, each support member having an aperture for receiving a plow shank. A hydraulic cylinder is mounted on each of the arms and is operable to pivot the shank support members to selectively position the shanks.

In accordance with another specific aspect of the invention, a plow tool bar includes diverging arms at the forward end thereof for connection to a prime mover. The rearward end of the tool bar is elongate and narrower than the forward end. A shank housing is connected to the rearward end of the tool bar, with at least one shank support member pivotally mounted within the housing and including an aperture for receiving a plow shank. An hydraulic cylinder is mounted on the housing and is operable to pivot the support member to selectively position the shank.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENTS

Figure 1:
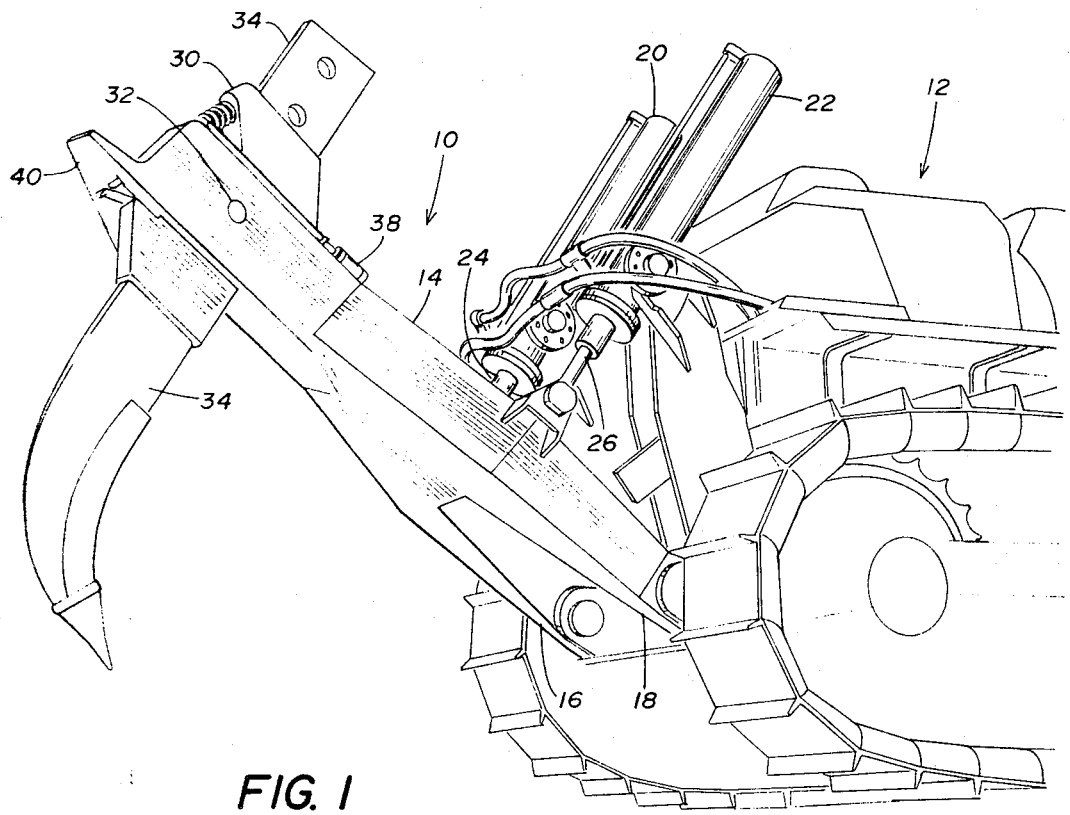
FIG. 1 is a perspective view of a single shank ripper plow embodying the present shank adjusting invention.

FIG. 1 illustrates a single shank ripper plow assembly designated generally by the numeral 10. A prime mover 12 may comprise, for instance, a caterpillar tractor or the like. A plow tool bar 14 includes at the forward end thereof a pair of outwardly diverging arms 16 and 18 which are pivotally connected to a hitch frame rigidly carried by the prime mover 12. A pair of hydraulic cylinders 20 and 22 are pivotally carried by upward extensions of the hitch frame and include movable shafts 24 and 26 which are connected to the tool bar 14. Operation of the cylinders 20 and 22 by the hydraulic controls of the prime mover enables the ripper plow assembly to be raised and lowered in the conventional manner. An example of a somewhat similar single shank heavy duty ripper plow is the KR-25D ripper plow manufactured and sold by the Kelley Products Division of CRC-Crose International, Inc. of Houston, Tex.

The rearward end of the tool bar 14 includes a shank support housing 30 which is pivotally mounted within the tool bar 14 by a pivot pin 32. A conventional ripper shank 34 is rigidly received within the support housing 30 and is pinned therein by the pin 32. By operation of a hydraulic cylinder 38, as will be subsequently described in greater detail, the housing 30 may be selectively pivoted with respect to the tool bar 14 in order to selectively adjust the angle of penetration of the shank 34. A conventional push plate 40 is provided on the rearward end of the tool bar 14 to enable pushing by an auxiliary vehicle.

Figure 2:
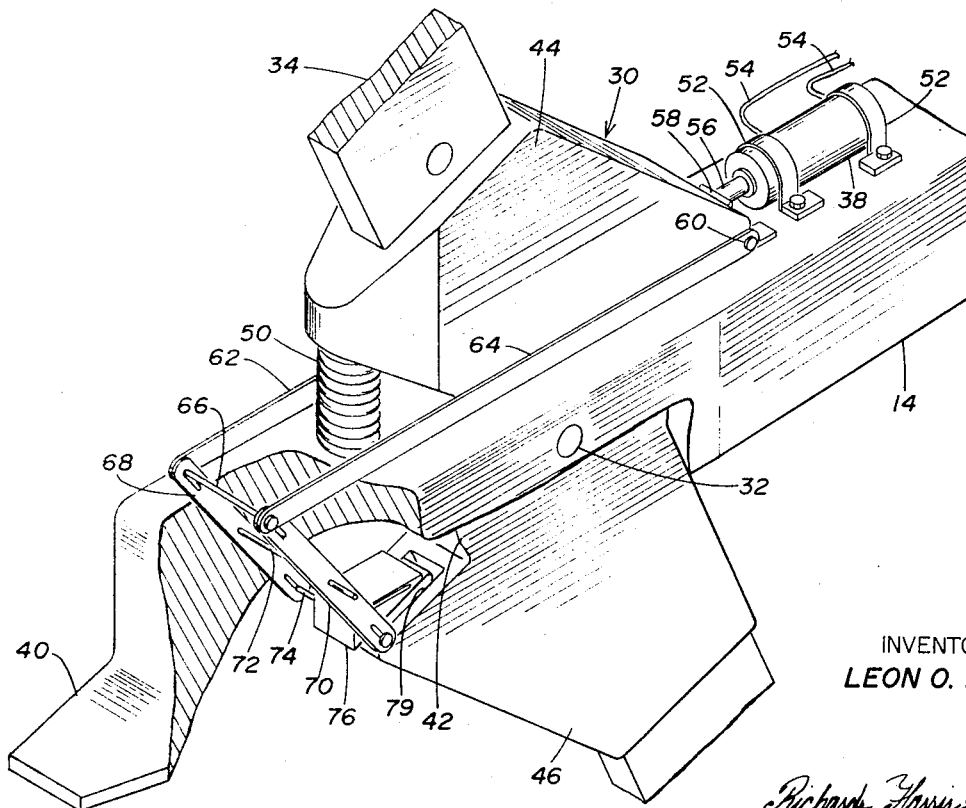
FIG. 2 is a perspective view, partially broken away, of the rearward end of the assembly shown in FIG. 1.

Referring to FIG. 2, the construction of the present variable shank assembly is illustrated in greater detail. The shank support housing 30 comprises a central generally circular portion 42 which is integrally connected to an upper extension 44 and a lower extension 46. The circular portion 42 is disposed within a generally circular chamber formed within the tool bar 14 and is pivotally mounted relative to the tool bar 14 upon the pivot pin 32. A vertical aperture or slot is formed through the housing 30 to slideably receive the upper end of the ripper shank 34.

A heavy duty coil spring 50 is disposed between the upper surface of the tool bar 14 and the upper extension 44 of the housing 30 in order to normally bias the housing 30 in a predetermined position. The hydraulic cylinder 38 is fixedly mounted to the tool bar 14 by suitable brackets 52, with hydraulic fluid being supplied to the cylinder 38 via fluid lines 54. The lines 54 are connected to the hydraulic system of the prime mover 12 so that the cylinder 38 may be selectively operated by the operator when desired.

The output shaft 56 of the cylinder 38 is rigidly attached to a wedge 58. A pin 60 extends through the wedge 58 and is attached at opposite ends to a pair of parallel rods 62 and 64. Rods 62 and 64 extend along the upper portion of the tool bar 14 on opposite sides of the housing 30. A pin 66 connects the ends of rods 62 and 64 with vertically disposed rods 68 and 70 which extend through slots defined through the tool bar 14. The bars 68 and 70 and pivotally mounted about a pin 72 which is fixed at the ends thereof within the tool bar 14. The lower ends of the rods 68 and 70 are connected to a pin 74 which extends through a wedge 76. Grooves 77 are formed along the sides of wedge 76 to receive projections from tool bar 14 (not shown) in order to maintain the wedge in the desired position under the tool bar.

Wedge 58 is adapted to abut with a pivoted pad 78 (FIGS. 3–5) connected to the upper extension 44, while wedge 76 is adapted to abut with a pad 79 pivotally connected to the lower extension 46 of the shank support housing 30. Operation of the cylinder 38 thus causes wedges 58 and 76 to be moved against the housing 30 in opposite directions to selectively pivot the housing counterclockwise about the pivot pin 32. Withdrawal of the wedges 58 and 76 allows the spring 50 to pivot the housing 30 clockwise about the pivot pin 32.

Figure 3:
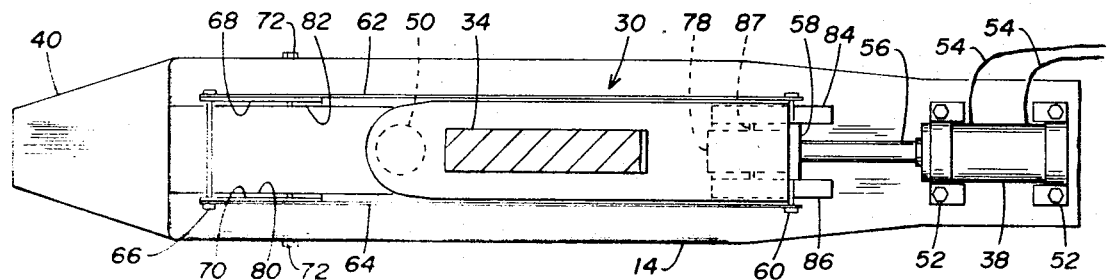
FIG. 3 is a top view of the rear portion of the assembly shown in FIG. 1.

FIG. 3 illustrates an upper view of the assembly shown in FIG. 2, wherein the slots 80 and 82 which receive the bars 68 and 70 are illustrated. Bars 68 and 70 are pivoted about the pivot pin 72 with respect to the tool bar 14. FIG. 3 also illustrates guide bars 84 and 86 which are fixed to the upper portion of the tool bar 14 in order to guide the wedge 58 along the desired path. The pad 78 is shown as pivotally mounted in housing 30 by a pin 87. In construction of the present system, a slot is cut in the rear end of the tool bar 14 and the housing 30 is inserted and pivotally pinned in place. A suitably shaped insert is then inserted in the slot and welded into place to form a cylindrical chamber which receives the housing 30.

Figure 4:
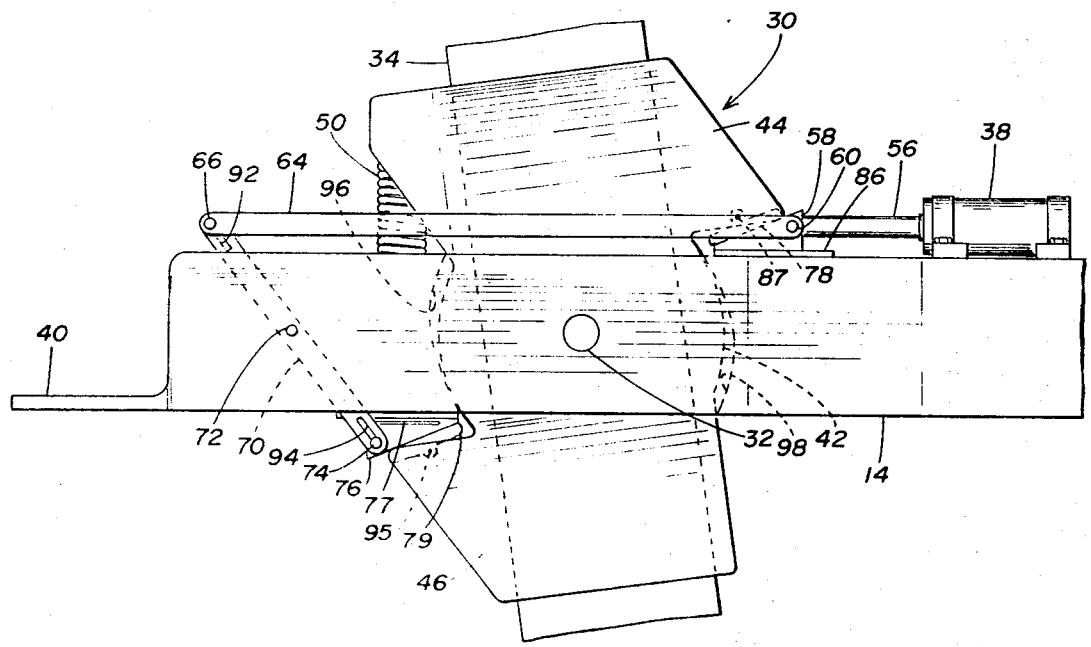
FIG. 4 is a side elevational view of the assembly shown in FIG. 3 illustrating the assembly in an actuated position.

FIG. 4 illustrates a side view of the present automatic shank adjusting device, with the shank 34 maintained at a substantial angle from vertical by the device. In this position, the hydraulic cylinder 38 is energized to extend shaft 56 to push the wedge 58 beneath the pivoted pad 78 connected to the housing 30. In addition, movement of the wedge 58 causes the rods 62 and 64 to move rearwardly, thereby causing the rods 68 and 70 to pivot about the pivot pin 72 in a counterclockwise direction. Rods 68 and 70 include slots 92 and 94 therein in order to enable the pins 66 and 74 to slide to accommodate such rotation of the bars. The wedge 76 is then moved against the pivoted pad 79 to aid in the pivoting of the housing 30. Pad 79 is pivoted about a pin 95 within the housing 30. The combined action of the wedges 58 and 76 cause the housing 30 to be pivoted about the pivot pin 32 to the desired position. Pads 78 and 79 pivot relative to housing 30 due to abutment with the wedges 58 and 76 in order to securely maintain the housing 30 in the desired tilted position. Movement of the housing 30 in the conterclockwise position causes the spring 50 to become compressed. The chamber within which the circular portion 42 of the housing 30 moves is generally circular, with the exception that the chamber is somewhat eccentric in the region generally identified by the numerals 96 and 98 to enable the necessary pivoting movement for the housing 30.

Figure 5:
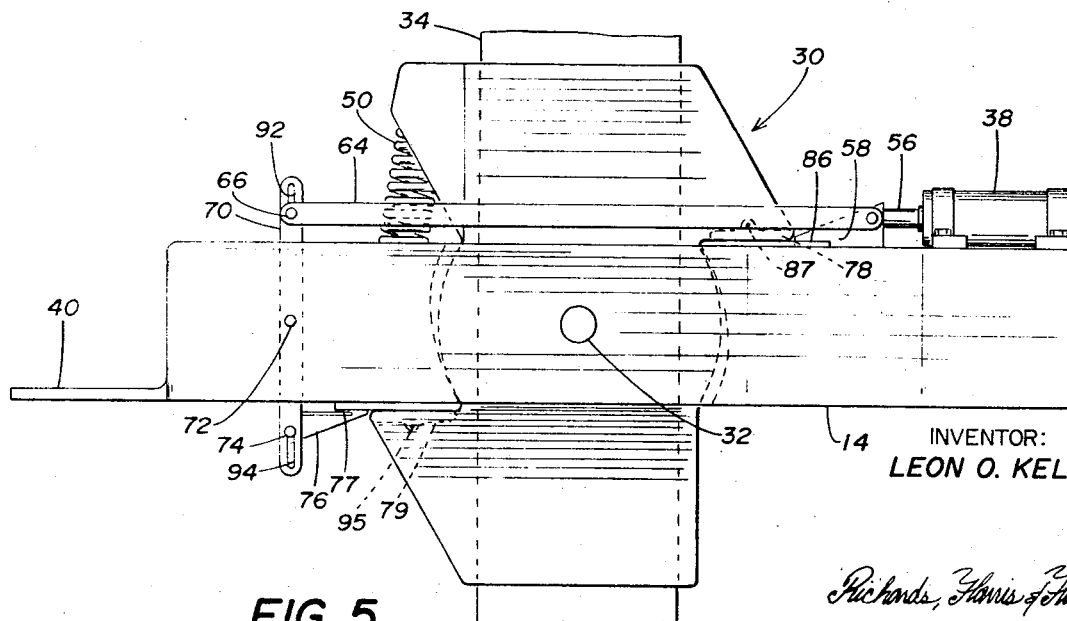
FIG. 5 is an elevational side view of the assembly shown in FIG. 3 in the normal de-energized position.

As shown in FIG. 5, as the shaft 56 of the cylinder 38 is retracted, wedges 58 and 76 are retracted from beneath the surfaces of the housing 30. The spring 50 then forces the housing 30 to the illustrated position such that the shank 34 is maintained in essentially a vertical position. In this position, the pads 78 and 79 pivot to horizontal positions and abut with surfaces of the tool bar 14 to maintain the shank 34 in a stabilized position. It will thus be seen that the shape of the wedges 58 and 76 and pads 78 and 79 are such that the shank 34 may be maintained in an extremely stable position in all degrees of angular position.

Figure 6:
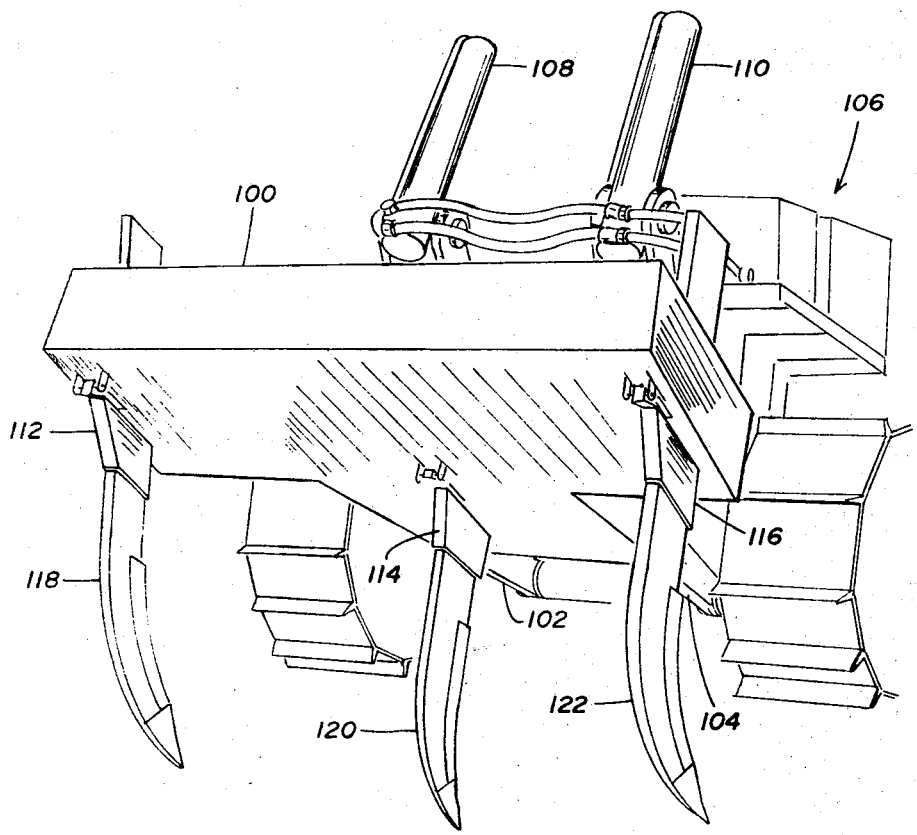
FIG. 6 is a perspective view of a multi-shank plow embodying the present invention.
Figure 7:
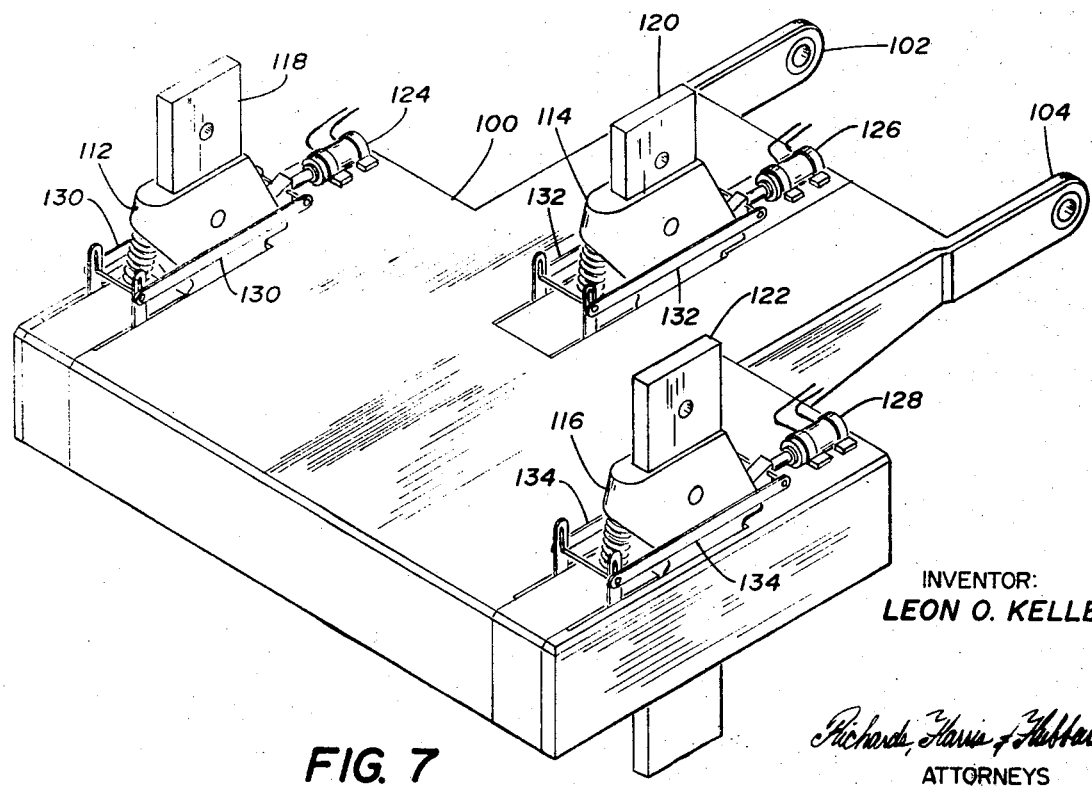
FIG. 7 is a top perspective view of the multi-shank assembly shown in FIG. 6.

FIGS. 6 and 7 illustrate views of a multi-shank embodiment of the invention. A generally T-shaped tool bar 100 includes outwardly diverging arms 102 and 104 which may be pivotally connected to the rear of a prime mover 106. Hydraulic cylinders 108 and 110 may be selectively actuated by the operator of the prime mover to raise or lower the tool bar 100. Each arm of the generally T-shaped tool bar 100 includes a pivotable shank support housing 112, 114 and 116 constructed in accordance with the invention.

Ripper plow shanks 118, 120 and 122 are suitably pinned within the housings 112–116 in the manner previously described. Fluid cylinders 124, 126 and 128 may be selectively actuated by the operator of the prime mover to pivot the housings 112-116 in the manner previously described. Linkage bars 130, 132 and 134 are operated by the hydraulic cylinders to simultaneously move the wedges to pivot the housings 112–116. It will thus be seen that the present shank angle positioning device may be utilized in a multi-shank plow arrangement in order to position each of the shanks in the same angular position, or to selectively position each of the shanks in a different angular position if desired.

Figure 8:
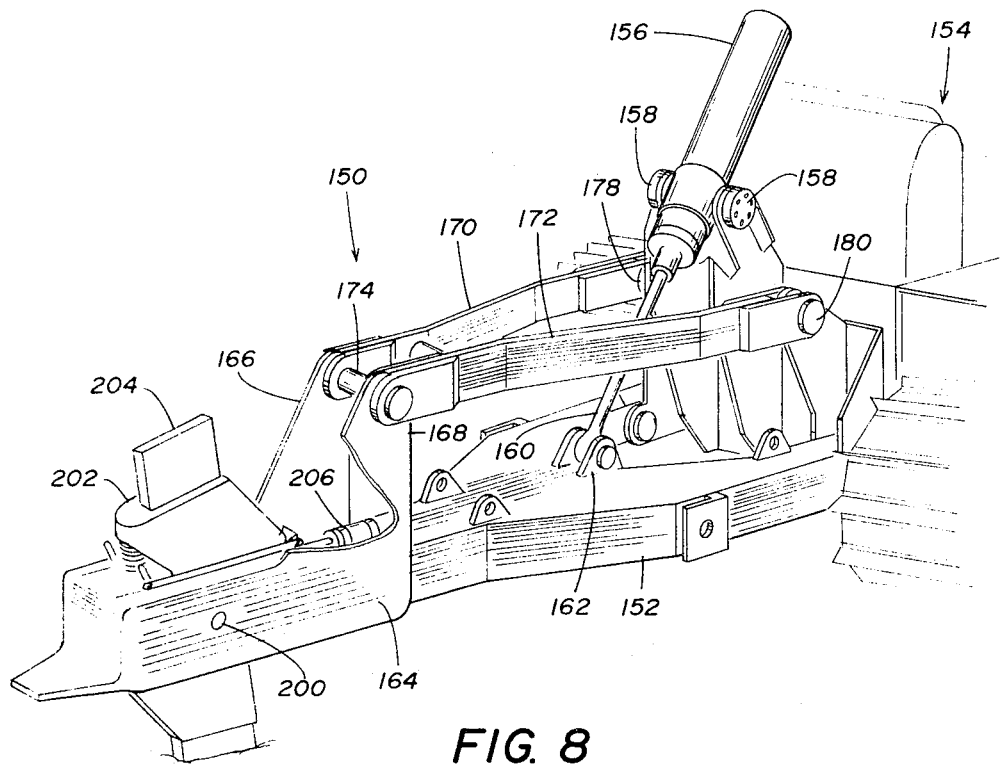
FIG. 8 is a perspective view of a parallelogram lift ripper plow embodying the present varible plow shank position invention.
Figure 9:
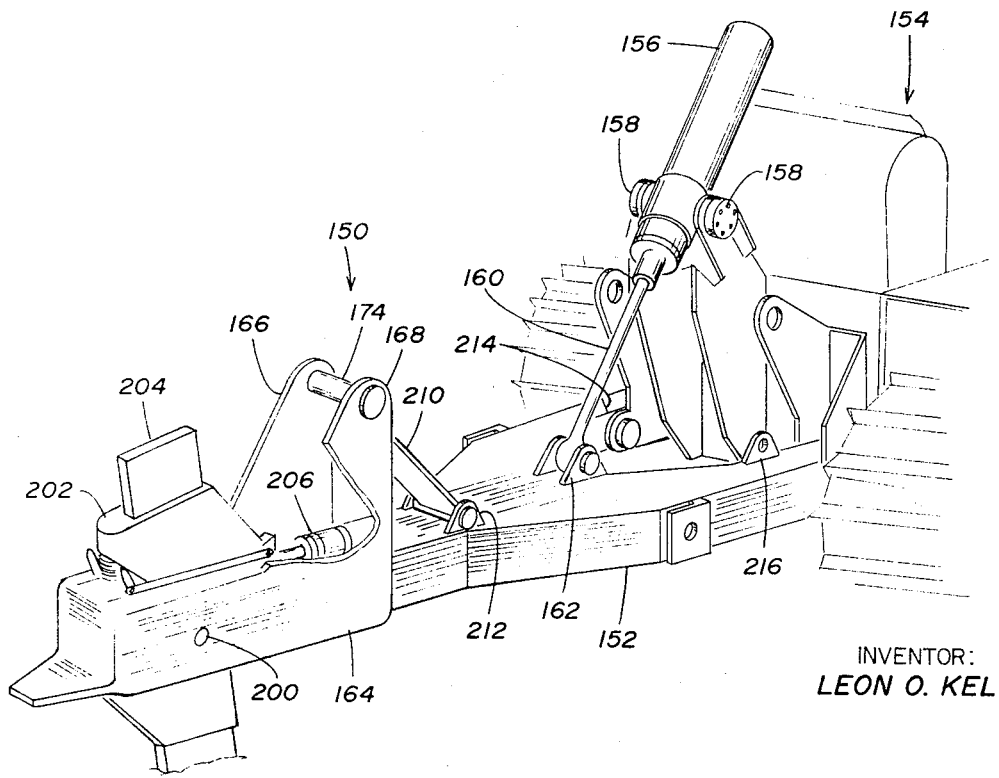
FIG. 9 is a perspective view of the plow assembly shown in FIG. 8 shown connected in a radial plow lift configuration.

FIGS. 8 and 9 illustrate yet another embodiment of a plow 150 utilizing the present shank angle adjusting invention. A tool bar 152 includes outwardly diverging arms for pivotal connection to a prime mover 154. A hitch frame structure supports a single hydraulic cylinder 156 by trunnions 158. The shaft 160 of the cylinder 156 is pivotally connected between lugs 162 to the tool bar 152.

The shank housing 164 is pivotally connected to the rearward end of the tool bar 152 and includes upstanding ears 166 and 168. In the embodiment shown in FIG. 8, a pair of linkage bars 170 and 172 are pivotally connected by a pin 174 between the ears 166 and 168. The bars 170 and 172 are pivotally connected at the opposite ends to lugs extending from the hitch frame by pins 178 and 180. Energization of the hydraulic cylinder 156 thus causes the plow 150 to operate as a parallelogram lift plow. For a more detailed description of the construction and operation of this parallelogram plow lift configuration, reference is made to the co-pending patent application Ser. No. 146,253, filed May 5, 1971, and entitled "Ripper Plow Assembly" by the present applicant (Attorney's Docket No. B1945).

The shank housing 164 includes a pivot point 200 about which a shank support housing 202 may be rotated in accordance with the present invention. A ripper shank 204 is supported within the housing 202. Operation of a fluid cylinder 206 from suitable controls on the prime mover 154 moves wedges against the shank support housing 202 in the manner previously described in order to pivot the housing 202 to the desired angular position with respect to the tool bar 152. In this manner, the shank 204 may be accurately positioned in any angular position desired.

Referring to FIG. 9, wherein like numerals are utilized for like and corresponding parts, the present plow has been connected in a radial plow lift configuration by removal of the bars 170 and 172. In place of the bars, a rigid plate 210 is connected by a pin 174 between the ears 166 and 168 and between lugs 212 which are rigidly mounted on the tool bar 152. In an alternate embodiment, the bars 170 and 172 may be connected to lugs 214 and 216 in order to provide an alternate radial plow lift configuration. For a more detailed explanation of this plow lift configuration, reference is made to the previously described copending patent application, Ser. No. 146,253.

In the embodiment shown in FIG. 9, a shank support housing 202 constructed in accordance with the present invention supports a shank 204. Operation of a fluid cylinder 206 causes wedges to abut against the housing 202 to selectively pivot the housing 202 about the pivot pin 200. The angular orientation of the shank 204 thus may be selectively varied.

It will be seen that the present invention provides a useful tool for automatically and accurately positioning the angle of penetration of plow shanks, and in particular heavy duty ripper plow shanks. The system is rugged and requires little maintenance, while maintaining the plow shanks in a rigid configuration regardless of the desired angular position selected. The system is adapted for a selection of a number of different configurations of plows and plow types.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A variable plow shank positioning assembly comprising:
   a tool bar,
   a shank support member pivotally mounted to said tool bar and including an aperture for rigidly receiving a plow shank,
   wedge means slidably movable relative to said tool bar, abutment means on said support member, and
   pressurized fluid means operable to move said wedge means against said abutment means to pivot said support member.

2. The assembly of claim 1 wherein said wedge means comprises first and second wedges connected by linkage.

3. The assembly of claim 2 wherein said first and second wedges are disposed on opposite sides of said shank support member and slide in opposite directions into selective engagement with first and second shoulder means on said support member.

4. The assembly of claim 2 and further comprising spring means to normally bias said shank in a predetermined position.

5. The assembly of claim 2 wherein said linkage comprises pivotally connected bars disposed on opposite sides of said shank support member.

6. The combination of claim 1 and further comprising:
   pivotally mounted shank housing means as part of said tool bar at the rear end and carrying said support member, and
   parallelogram linkage bars connected at one end to said shank housing and adapted for connection to a prime mover whereby said tool bar is adapted in a parallelogram lift configuration.

7. The combination of claim 6 wherein said tool bar has diverging arms at the forward end adapted for connection to a prime mover, the rearward end of said tool bar being elongate and narrower than said forward end.

8. The combination of claim 1 and further comprising:
   pivotally mounted shank housing means as part of said tool bar at the rear end and carrying said support member, and
   rigid plate means connected between said shank housing means and said tool bar whereby said tool bar is adapted in a radial lift configuration.

9. The combination of claim 1 wherein said tool bar carries a plurality of ripper plow shanks.

10. A variable plow shank positioning assembly comprising:
    a frame member defining an opening including a generally circular interior cavity,
    a shank support member pivotally mounted to said frame having a circular portion disposed in said cavity, said shank support adapted to rigidly receive a ripper shank and having first and second abutment surfaces oppositely projecting therefrom with respect to the pivot of said support,
    spring means disposed between said frame and said support biasing said support to a predetermined position relative to said frame,
    a hydraulic cylinder mounted on said frame, and
    first and second wedges mounted for slidable engagement at said first and second abutments, said first wedge operably connected to the rod of said cylinder and said second wedge linked to said first wedge whereby said wedges are operable to vary the position of said support relative to said frame.

11. The combination of claim 10 wherein said first and second abutment surfaces are provided with pivotally mounted pads.

* * * * *